United States Patent
Zhang et al.

(10) Patent No.: US 11,787,165 B2
(45) Date of Patent: Oct. 17, 2023

(54) LAMINATING DEVICE AND LAMINATING METHOD

(71) Applicant: KunShan Go-Visionox Opto-Electronics Co., Ltd, Jiangsu (CN)

(72) Inventors: Shuai Zhang, Kunshan (CN); Chunxiao Gu, Kunshan (CN); Kun Zhao, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 0 days.

(21) Appl. No.: 17/715,437

(22) Filed: Apr. 7, 2022

(65) Prior Publication Data

US 2022/0227112 A1    Jul. 21, 2022

Related U.S. Application Data

(63) Continuation of application No. PCT/CN2021/080788, filed on Mar. 15, 2021.

(30) Foreign Application Priority Data

Apr. 27, 2020 (CN) .......................... 202010345410.5

(51) Int. Cl.
*B32B 37/00* (2006.01)

(52) U.S. Cl.
CPC ........ *B32B 37/0046* (2013.01); *B32B 37/003* (2013.01); *B32B 2457/20* (2013.01)

(58) Field of Classification Search
CPC .............. B32B 37/0046; B32B 37/003; B32B 2457/20; B32B 2457/202;
(Continued)

(56) References Cited

U.S. PATENT DOCUMENTS

2017/0100922 A1\* 4/2017 Kim ........................ B32B 37/10

FOREIGN PATENT DOCUMENTS

| CN | 107379567 A | 11/2017 |
| CN | 108016655 A | 5/2018 |

(Continued)

OTHER PUBLICATIONS

The International search report for PCT Application No. PCT/CN2021/080788, dated Jun. 10, 2021, 11 pages.
(Continued)

*Primary Examiner* — Carson Gross
(74) *Attorney, Agent, or Firm* — Maier & Maier, PLLC

(57) ABSTRACT

A laminating device adapted for laminating a curved cover plate and a flexible screen. The laminating device includes at least one elastic support assembly and a flexible supporting board for supporting the flexible screen. The flexible supporting board includes a top wall having a central spine portion and loading portions; The elastic support assembly is deformable so that the flexible supporting board can be deformed from a first state to a second state under a pressing effect of the curved cover plate; in the first state, the flexible supporting board is in a shape of a ridge and one of the loading portions is obliquely connected between the central spine portion and one of the side walls, so that in the process of the flexible supporting board being deformed from the first state to the second state, the inclination of the loading portion gradually decreases.

20 Claims, 9 Drawing Sheets

(58) Field of Classification Search
CPC ........ B32B 2457/204; B32B 2457/206; B32B 2457/208; B32B 38/1866; Y10T 156/1028
See application file for complete search history.

(56) References Cited

FOREIGN PATENT DOCUMENTS

| | | |
|---|---|---|
| CN | 109648979 A | 4/2019 |
| CN | 110014717 A | 7/2019 |
| CN | 110126249 A | 8/2019 |
| CN | 10307231 A | 10/2019 |
| CN | 110588132 A | 12/2019 |
| CN | 110667095 A | 1/2020 |
| CN | 110861290 A | 3/2020 |
| CN | 111497411 A | 8/2020 |
| KR | 20180073862 A | 7/2018 |

OTHER PUBLICATIONS

The First Office Action for Chinese Application No. 202010345410. 5, dated Oct. 20, 2021, 10 pages.

* cited by examiner

LAMINATING DEVICE AND LAMINATING METHOD

CROSS-REFERENCE OF RELATED APPLICATIONS

The present application is a continuation of International Application No. PCT/CN2021/080788, filed on Mar. 15, 2021, which claims priority to Chinese Patent Application No. 202010345410.5, filed on Apr. 27, 2020, both of which are hereby incorporated by reference in their entireties.

TECHNICAL FIELD

The present application relates to the technical field of flexible screen laminating equipment, in particular to a laminating device and a laminating method.

BACKGROUND

With the advent of the ubiquitous screen era, people's demand for full screens is becoming stronger. In order to increase the screen-to-body ratio, the hyperbolic laminating technology and the four-curved laminating technology came into being.

In the prior art, the flexibility of the flexible screen is mainly used to realize a full screen. The current laminating method of the flexible screen mainly use a silicone pad to press the flexible screen to the inner side of the curved cover plate. During the laminating process, because the laminating pressure in the plane area of the curved cover plate is greater than the laminating pressure in the bending area of the curved cover plate, the laminating pressure in the bending area is small, and bubbles are prone to appear, which will lead to poor laminating between the curved cover plate and the flexible screen.

Therefore, there is an urgent need for a new laminating device and laminating method

SUMMARY

The present application provides a laminating device and a laminating method, which aim to solve the problem of bubbles generated during the laminating process of the flexible screen and the cover plate.

The embodiment of the first aspect of the present application provides a laminating device for laminating a curved cover plate and a flexible screen. The laminating device includes at least one elastic support assembly and a flexible supporting board for supporting the flexible screen. The flexible supporting board includes a top wall and two side walls facing to each other in a width direction of the top wall. The top wall has a central spine portion extending along a length direction of the top wall and loading portions located on both sides of the central spine portion. The top wall is connected to one of the side walls through one of the loading portions. The side walls and the top wall enclose to form a hollow space; the elastic support assembly is located in the hollow space and is configured to support the flexible supporting board. The elastic support assembly is arranged to be deformable in the pressing direction of the curved cover plate so that the flexible supporting board is deformed from a first state to a second state under the pressing effect of the curved cover plate; wherein, in the first state, the flexible supporting board is in a shape of a ridge, and one of the loading portions is obliquely connected between the central spine portion and one of the side walls, so that during a process of the flexible supporting board being deformed from the first state to the second state, an inclination of the loading portion gradually decreases.

According to any one of the foregoing embodiments of the first aspect of the present application, a thickening portion is correspondingly located between the side wall and the elastic support assembly, and/or the laminating device further includes at least two elastic support assemblies, and the at least two elastic support assemblies are distributed along the width direction of the top wall, there is a space between two adjacent elastic support assemblies, and the thickening portion is correspondingly located between the two adjacent elastic support assemblies.

According to any one of the foregoing embodiments of the first aspect of the present application, the laminating device further includes at least two elastic support assemblies, the at least two elastic support assemblies are distributed in the width direction of the top wall, there is a space between two adjacent elastic support assemblies, and a heating component is located between the two adjacent elastic support assemblies, and/or the heating component is located between one of the elastic support assemblies and one of the side walls.

According to any one of the foregoing embodiments of the first aspect of the present application, the laminating device further includes a plurality of heating components, and the plurality of heating components are evenly distributed in the hollow space.

The embodiment of the second aspect of the present application also provides a laminating method, which uses the above-mentioned laminating device to laminate the curved cover plate and the flexible screen, and the method includes:

Placing the flexible screen on the flexible supporting board, and making the flexible supporting board in the first state;

Disposing the curved cover plate on the flexible screen in a covering manner;

Applying pressure to the curved cover plate to make the flexible supporting board deform from the first state to the second state. The inclination of the loading portion is gradually reduced. The two side walls move away from each other. The curved cover plate and the flexible screen are laminated gradually from the position corresponding to the central spine portion.

In the laminating device of the embodiment of the present application, the laminating device includes a flexible supporting board and at least one elastic support assembly. During the laminating process of the curved cover plate and the flexible screen, the flexible screen can be arranged on the top wall of the flexible supporting board in the first state. In the initial stage of pressing, the curved cover plate is firstly laminated at the position corresponding to the central spine portion. Then, pressure is applied to the curved cover plate, and since the elastic support assembly is arranged to be deformable in the pressing direction of the curved cover plate, the flexible supporting board can be deformed from the first state to the second state. During this process, the inclination of the loading portion gradually decreases, and the curved cover plate and the flexible screen are gradually laminated, that is, the contact between the flexible screen and the curved cover plate is gradually pressed from the middle to the two sides, which can effectively eliminate the air bubbles between the curved cover plate and the flexible screen, and can improve the product yield.

BRIEF DESCRIPTION OF THE DRAWINGS

By reading the following detailed description of the non-limiting embodiments with reference to the accompa

DETAILED DESCRIPTION

Figure 1:
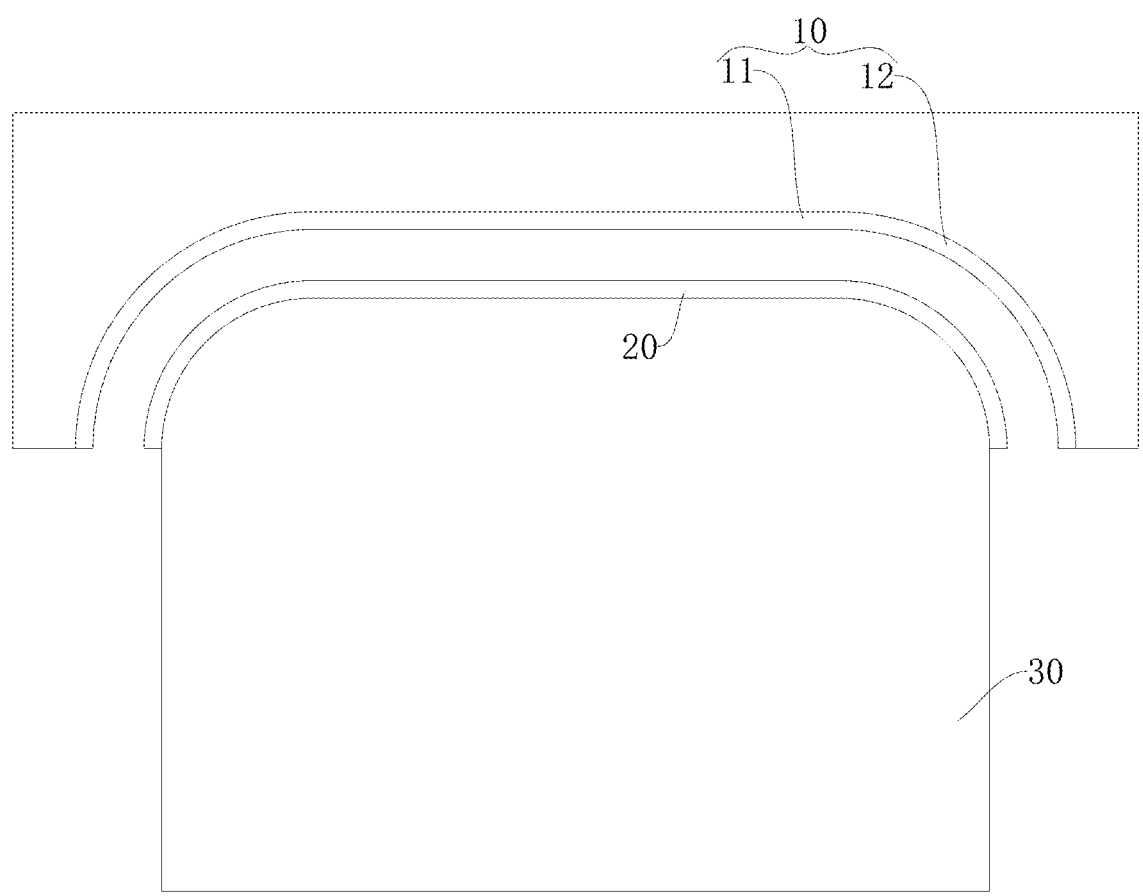
- FIG. 1 is a schematic diagram of the structure of a laminating device.

The features and exemplary embodiments of various aspects of the present application will be described in detail below. In the following detailed description, many specific details are proposed in order to provide a comprehensive understanding of the present application. However, it is obvious to the skilled person in the art that the present application can be implemented without some of these specific details. The following description of the embodiments is only to provide a better understanding of the present application by showing examples of the present application. In the drawings and the following description, at least part of the well-known structures and technologies are not shown in order to avoid unnecessary blurring of the present application; and, for clarity, the size of some structures may be exaggerated. In addition, the features, structures or characteristics described below may be combined in one or more embodiments in any suitable manner.

The orientation words appearing in the following description are all directions shown in the figures, and do not limit the specific structure of the embodiments of the present application. In the description of the present application, it should also be noted that, unless otherwise clearly specified and limited, the terms "mounting" and "connection" should be understood in a broad sense, for example, it can be a fixed connection or a detachable connection, or an integral connection; it can be a direct connection or indirect connection. For the skilled person in the art, the specific meaning of the above-mentioned terms in the present application can be understood according to specific circumstances.

With the advent of the ubiquitous screen era, people's demand for full screens is becoming stronger. In order to increase the screen-to-body ratio, the hyperbolic laminating technology and the four-curved laminating technology came into being. However, the current surface laminating has a problem of low yield.

As shown in FIG. 1, a flexible silicone substrate 30 is generally used to realize the mutual laminating of the curved cover plate 10 and the flexible screen 20. The curved cover plate 10 includes a curved portion 12 and a flat portion 11. A typical curved cover plate 10 includes two curved portions 12 opposite to each other in the width direction, and the flat portion 11 is connected between the two curved portions 12. The curved portion 12 has a relatively large curvature, and the flat portion 11 is generally flat.

The flexible silicone substrate 30 of FIG. 1 includes a loading surface, and the shape of the loading surface matches the shape of the curved cover plate 10. In the process of laminating the curved cover plate 10 and the flexible screen 20, the flexible screen 20 is firstly placed on the loading surface, and then the curved cover plate 10 is pressed on the flexible screen 20.

Since the laminating pressure of the flat portion 11 of the curved cover plate 10 is greater than the laminating pressure of the curved portion 12, laminating bubbles are prone to appear in the curved portion 12, and the risk of laminating rebound is prone to occur, resulting in poor laminating between the curved cover plate 10 and the flexible screen 20. And when the minimum space between the two curved portions 12 is smaller than the width of the curved cover plate 10, that is, when the opening of the curved cover plate 10 is small, the curved cover plate 10 and the flexible screen 20 cannot be laminated.

In order to solve the above technical problems, the present application is proposed.

In order to better understand the present application, the laminating device 1 and the laminating method of the embodiment of the present application will be described in detail below with reference to FIGS. 2 to 19.

Figure 2:
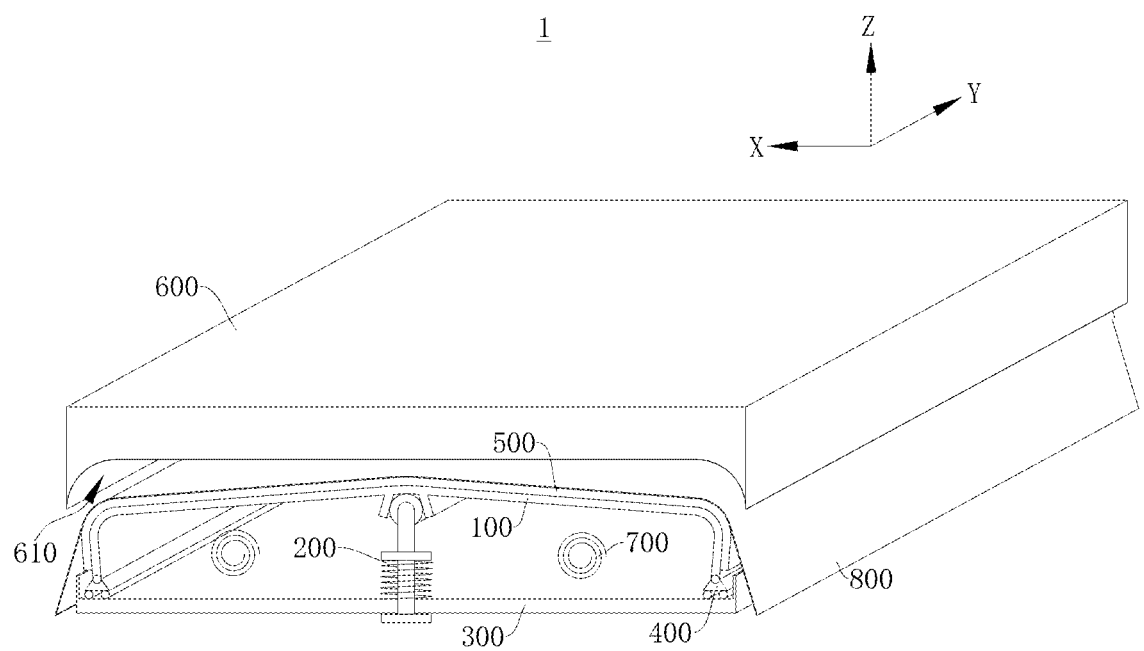
FIG. 2 is a schematic diagram of a structure of a laminating device provided by an embodiment of the present application.
Figure 3:
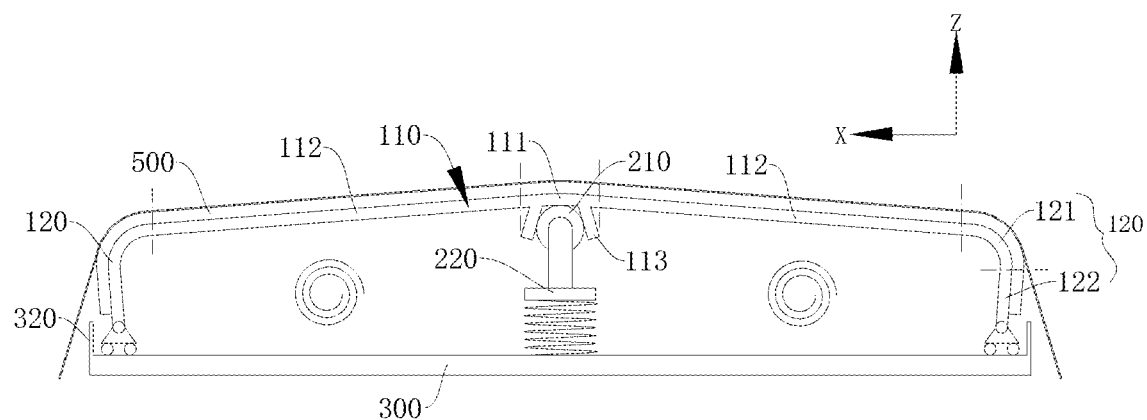
FIG. 3 is a schematic diagram of a structure of a laminating device in a first state according to an embodiment of the present application.
Figure 4:
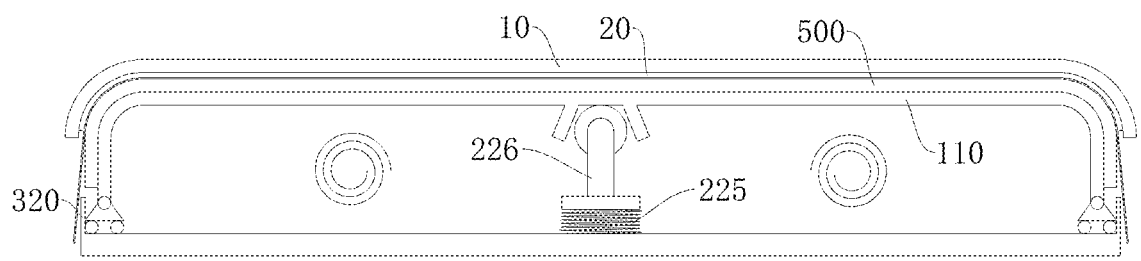
FIG. 4 is a schematic diagram of a structure of a laminating device in a second state according to an embodiment of the present application.

Please refer to FIGS. 2 and 3 together. FIG. 2 is a schematic diagram of a structure of a laminating device 1 provided by an embodiment of the present application, and FIG. 3 is a front view of a laminating device 1 provided by an embodiment of the present application, and FIG. 4 is a schematic diagram of a structure of a laminating device 1 in another use state provided by an embodiment of the present application.

The laminating device 1 of the embodiment of the present application is used for laminating the curved cover plate 10 and the flexible screen 20. The laminating device 1 includes: a flexible supporting board 100 for supporting the flexible screen 20 and at least one elastic support assembly 200. The flexible supporting board 100 includes a top wall 110 and two side walls 120 facing to each other in a width direction of the top wall (X direction in FIG. 2). The top wall 110 has a central spine portion 111 formed by extending along a length direction of the top wall (Y direction in FIG. 2) and loading portions 112 located on both sides of the central spine portion 111. The top wall 110 is connected to one of the side walls 120 through one of the loading portions 112, and the side walls 120 and the top wall 110 enclose to form a hollow space. The elastic support assembly 200 is located in the hollow space and is used to support the flexible supporting board 100. The elastic support assembly 200 is arranged to be deformable in the pressing direction of the curved cover plate 10 so that the flexible supporting board 100 can be deformed from a first state to a second state under the pressing effect of the curved cover plate 10. In the first state, the flexible supporting board 100 is in a shape of a ridge, and the loading portion 112 is obliquely connected between the central spine portion 111 and one of the side walls 120, so that during the process of the flexible supporting board 100 being deformed from the first state to the second state, the inclination of the loading portion 112 gradually decreases.

The gradual decrease in the inclination of the loading portion 112 means that the angle between the loading portion 112 and the horizontal direction is gradually reduced. When the inclination of the loading portion 112 gradually decreases, the flexible supporting board 100 changes from a bent state to a flattened state.

The first state and the second state can be disposed in many ways. FIG. 3 is a schematic diagram of a structure of the flexible supporting board 100 in the first state in the embodiment of the present application. FIG. 4 is a schematic diagram of a structure of the flexible supporting board 100 in the second state in the embodiment of the present application. In the process of the flexible supporting board 100 being deformed from the first state to the second state, the top wall 110 changes from the ridge shape in FIG. 3 to the plane shape in FIG. 4.

The structure of the flexible supporting board 100 in a natural state can be disposed in many ways. For example, the flexible supporting board 100 is in the first state as shown in FIG. 3 in the natural state, and the flexible screen 20 can be directly disposed on the flexible supporting board 100 in the natural state (i.e. the first state) when use. Or, the flexible supporting board 100 is in the second state as shown in FIG. 4 in the natural state, before the flexible screen 20 is disposed on the flexible supporting board 100, or after the flexible screen 20 is disposed on the flexible supporting board 100, the flexible supporting board 100 is driven to be in the first state, and the flexible supporting board 100 is changed from the first state to the second state during the laminating process of the flexible screen 20 and the curved cover plate 10.

In FIG. 3, in order to show the structure of the flexible supporting board 100 more clearly, the top wall 110, the central spine portion 111, the loading portion 112, and the side walls 120 are defined on the flexible supporting board 100 with dotted lines. The dotted line does not constitute a structural limitation of the laminating device 1 of the embodiment of the present application.

The pressing direction of the curved cover plate can be disposed in many ways. For example, the pressing direction of the curved cover plate is a vertical direction or a horizontal direction. The embodiment of the present application will be described with an example in which the pressing direction of the curved cover plate is the height direction of the laminating device 1 (the Z direction in FIG. 2).

In the laminating device 1 of the embodiment of the present application, the laminating device 1 includes a flexible supporting board 100 and at least one elastic support assembly 200. During the laminating process of the curved cover plate 10 and the flexible screen 20, the flexible screen 20 may be disposed on the top wall 110 of the flexible supporting board 100 in the first state. In the initial stage of pressing, the curved cover plate 10 is firstly laminated at the position corresponding to the central spine portion 111. Then, pressure is applied to the curved cover plate 10, and since the elastic support assembly 200 is deformable in the pressing direction of the curved cover plate 10, the flexible supporting board 100 can be deformed from the first state to the second state. During this process, the inclination of the loading portion 112 gradually decreases, and the curved cover plate 10 and the flexible screen 20 are gradually laminated, that is, the contact between the flexible screen 20 and the curved cover plate 10 is realized by gradually pressing from the middle to the two sides, which can effectively eliminate the air bubbles between the curved cover plate 10 and the flexible screen 20 and improve the product yield.

In addition, in the laminating device 1 of the embodiment of the present application, when the flexible supporting board 100 is deformed from the first state to the second state, the inclination of the loading portion 112 gradually decreases, and the size of the loading portion 112 in the width direction of the top wall gradually increase. When the bending angle of the curved portion 12 on the curved cover plate 10 is large, so that the minimum size between the two curved portions 12 on the curved cover plate 10 is smaller than the size of the flat portion 11, that is, when the size of the opening of the curved cover plate 10 is smaller than the width of the curved cover plate 10, the curved cover plate 10 can still be fastened to the top wall 110, and the flexible screen 20 and the curved cover plate 10 are gradually pressed together from the inside to the outside.

Please continue to refer to FIG. 2. In some alternative embodiments, the laminating device 1 further includes a pressing station 600, the pressing station 600 includes a receiving groove 610 for accommodating the curved cover plate 10, and the pressing station 600 is located on the side of the flexible supporting board 100 away from the elastic support assembly 200, and the pressing station 600 is arranged to be movable along the pressing direction of the curved cover plate 10.

In these alternative embodiments, during the laminating process of the curved cover plate 10 and the flexible screen 20, the curved cover plate 10 may be disposed in the pressing station 600, and the pressing station 600 may be driven in a direction close to the flexible supporting board 100, thereby causing that the curved cover plate 10 provides a pressing force to the flexible supporting board 100, so as to press the curved cover plate 10 onto the flexible screen 20.

In some optional embodiments, the laminating device 1 further includes a heating component 700 arranged in the hollow space. The heating component 700 can provide heat energy to the flexible supporting board 100 and the flexible screen 20 disposed on the flexible supporting board 100, so that the flexible screen 20 has a good flexibility and the flexible supporting board 100 can be better deformed.

When the laminating device 1 further includes at least two elastic support assemblies 200, and the at least two elastic support assemblies 200 are distributed in the width direction of the top wall, there is a space between two adjacent elastic support assemblies, the heating component 700 is located between the two adjacent elastic support assemblies 200, and/or the heating component 700 is located between one of the elastic support assemblies 200 and one of the side walls 120.

In some optional embodiments, a plurality of heating components 700 are evenly distributed in the hollow space, so that the plurality of heating components 700 can provide uniform heat energy to the flexible supporting board 100 and the flexible screen 20.

The elastic support assembly 200 can provide support to the flexible supporting board 100 by a plurality of ways. For example, the elastic support assembly 200 has elasticity, one end of the elastic support assembly 200 can be disposed on any supporting surface, and the other end of the elastic support assembly 200 is connected to the top wall 110 so that the elastic support assembly 200 can provide support to the flexible supporting board 100.

In some optional embodiments, the laminating device 1 further includes a base 300, and the elastic support assembly 200 is supported and connected between the base 300 and the top wall 110. The base 300 can provide good support to the elastic support assembly 200 and the flexible supporting board 100.

In some optional embodiments, the elastic support assembly 200 includes a support portion 210 formed by extending in the length direction of the top wall and at least two reset portions 220 connected to the support portion 210. The reset portion 220 is connected to a side of the support portion 210 facing away from the flexible supporting board 100. The support portion 210 is used to support the flexible supporting board 100, and at least two reset portions 220 are distributed along the length direction of the top wall, there is a space between two adjacent reset portions, so that the at least two reset portions 220 can stably support the support portion 210. Each of the reset portions 220 is deformable in the pressing direction of the curved cover plate, and the deformation of the reset portions 220 enables the flexible supporting board 100 to be deformed from the first state to the second state.

In some optional embodiments, one support portion 210 is provided with two reset portions 220 correspondingly, and the two reset portions 220 are connected to both ends of the support portion 210 in the length direction of the top wall. In other optional embodiments, one support portion 210 may also be correspondingly provided with at least three reset portions 220, and the at least three reset portions 220 are distributed in the length direction of the top wall, there is a space between two adjacent reset portions, and the at least three reset portions 220 are connected to the same support portion 210.

In some optional embodiments, the reset portion 220 is retractable in the pressing direction of the curved cover plate, so that the flexible supporting board 100 can be changed from the first state to the second state.

Or, in other optional embodiments, the reset portion 220 can be in a reciprocating deformation in the pressing direction of the curved cover plate, so that the flexible supporting board 100 can be changed between the first state and the second state mutually, and the flexible supporting board 100 can be used repeatedly.

The reset portion 220 can deform in many ways. For example, the reset portion 220 includes a deforming portion 225 and a connecting portion 226 which are successively distributed in the pressing direction of the curved cover plate. The deforming portion 225 is connected to the support portion 210 through the connecting portion 226, and the deforming portion 225 is deformable in the pressing direction of the curved cover plate.

Figure 5:
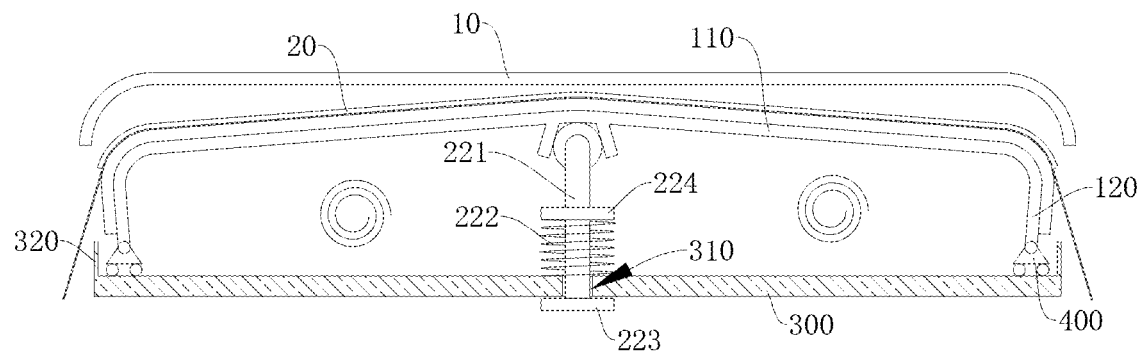
FIG. 5 is a front view of a laminating device in a first state according to another embodiment of the present application.
Figure 6:
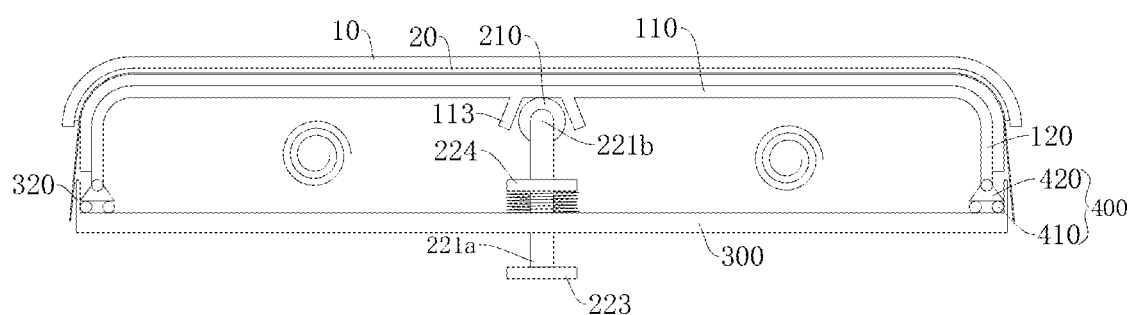
FIG. 6 is a front view of a laminating device in a second state according to another embodiment of the present application.

Or, please refer to FIG. 5 and FIG. 6 together. FIG. 5 shows a schematic diagram of a structure of the laminating device 1 in the first state in another embodiment of the present application. In order to show the structure of the base 300, a cross-sectional view of the base 300 is shown in FIG. 5. FIG. 6 shows a schematic diagram of a structure of the laminating device 1 in the second state in another embodiment of the present application.

In other optional embodiments, the base 300 is provided with a through hole 310; the reset portion 220 includes a guide rod 221 and an elastic member 222. One end of the guide rod 221 is located in the through hole 310 and is arranged to be movable along the through hole 310 in the pressing direction of the curved cover plate. The elastic member 222 is arranged on the guide rod 221 and is arranged to be in a reciprocating deformation along the guide rod 221.

In these alternative embodiments, the reset portion 220 includes a guide rod 221 and an elastic member 222 so that the elastic member 222 can move along the guide rod 221. By properly disposing the extension direction of the guide rod 221, the deformation direction of the elastic member 222 can be controlled, and then the deformation direction of the reset portion 220 can be controlled, so that the flexible supporting board 100 can be deformed in a preset manner. In the process of resetting and deforming of the elastic member 222, the guide rod 221 is arranged to be movable in the through hole 310, so that the space between the flexible supporting board 100 and the base 300 will be changed, and thus the flexible supporting board 100 can be deformed from the first state to the second state.

In some optional embodiments, the guide rod 221 has a first end 221a and a second end 221b opposite to each other in the pressing direction of the curved cover plate. The second end 221b is connected to the support portion 210, and the first end 221a is connected to a first baffle 223. The first baffle 223 is located on the side of the base 300 away from the top wall 110 to prevent the guide rod from falling off from the through hole 310, so that the guide rod 221 can be in a reciprocating movement in the pressing direction of the curved cover plate in the through hole 310.

The elastic member 222 can be arranged in many ways. For example, the elastic member 222 is a spring, and the spring is sleeved on the guide rod 221 so that the spring can be in a reciprocating deformation along the guide rod 221.

In some optional embodiments, the guide rod 221 is further provided with a second baffle 224. The second baffle 224 is located between the base 300 and the top wall 110, and the elastic member 222 is located between the base 300 and the second baffle 224. By providing the second baffle 224, the elastic member 222 can be provided with a position limit, so that the elastic member 222 can be in a reciprocating deformation between the second baffle 224 and the base 300.

In some optional embodiments, when the laminating device 1 includes the base 300, the side wall 120 can be movable relative to the base 300 in the width direction of the top wall. When the flexible supporting board 100 is deformed from the first state to the second state, the inclination of the loading portion 112 gradually decreases, and the space between the side wall 120 and the central spine portion 111 gradually increases.

In these alternative embodiments, the side walls 120 are arranged to be movable relative to the base 300, so that the two side walls 120 can move away from each other. The size of the flexible supporting board 100 in the width direction of the top wall gradually increases, and the curved cover plate 10 and the flexible screen 20 are gradually laminated.

The number of the elastic support assembly 200 can be disposed in many ways, and the number of the elastic support assembly 200 can be one or more. In some optional embodiments, the elastic support assembly 200 includes a first support assembly 200a connected between the central spine portion 111 and the base 300, and the first support assembly 200a is used to support the central spine portion 111. When the flexible supporting board 100 is deformed from the first state to the second state, the first support assembly 200a is used to provide elastic support to the central spine portion 111 so that the central spine portion 111 can move in a direction close to the base 300.

In some optional embodiments, the first support assembly 200a and the central spine portion 111 are fixedly connected so as to avoid tilting of the central spine portion 111 when moving in a direction close to the base 300.

The first support assembly 200a can be fixedly connected to the central spine portion 111 in many ways. In some alternative embodiments, the support portion 210 of the first support assembly 200a and the central spine portion 111 are fixedly connected. For example, the support portion 210 of the first support assembly 200a is welded to the central spine portion 111.

Or, in some optional embodiments, the top wall 110 is provided with a first clamping portion 113 on the surface facing the first support assembly 200a, and the support portion 210 of the first support assembly 200a and the first clamping portion 113 are fixedly connected in a clamping manner.

In these alternative embodiments, the support portion 210 of the first support assembly 200a and the central spine portion 111 are connected by the first clamping portion 113 in a clamping manner, which facilitates the mounting and removal of the laminating device 1. During the transportation of the laminating device 1, the laminating device 1 can be disassembled to reduce the occupied space of the laminating device 1, which facilitates the transportation of the laminating device 1.

In some optional embodiments, the first clamping portion 113, the support portion 210 of the first support assembly 200a, and the central spine portion 111 have the same size in the length direction, so that the first support assembly 200a can provide good support for the central spine portion 111.

The first clamping portion 113 is connected to the support portion 210 in a clamping manner in many ways. In some optional embodiments, one of the first clamping portion 113 and the support portion 210 is a clamping groove, and the other is a clamping column, and the clamping column is clamped in the clamping groove.

As shown in FIGS. 3 to 5, the support portion 210 has a columnar structure, the support portion 210 is a clamping column, the first clamping portion 113 is a clamping groove, and the support portion 210 is clamped in the clamping groove.

Figure 7:
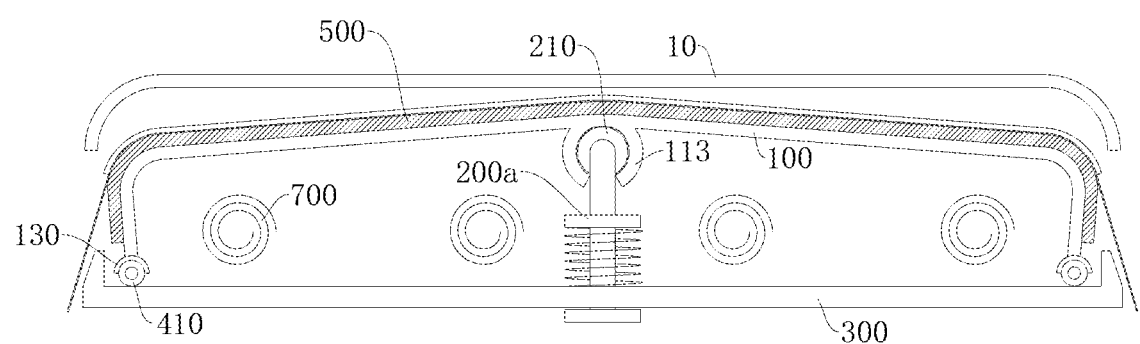
FIG. 7 is a top view of a laminating device provided by further another embodiment of the present application.

In some alternative embodiments, please also refer to FIG. 7 together, the size of the opening of the clamping groove is smaller than the size of the support portion 210 so as to prevent the support portion 210 from being detached from the clamping groove via the opening when the flexible supporting board 100 is deformed from the second state to the first state.

The side wall 120 can be movable relative to the base 300 in the width direction in many ways. Please continue to refer to FIG. 7. When the number of the elastic support assembly 200 is one, the laminating device 1 further includes a sliding portion 400. The sliding portion is supported and connected between the side wall 120 and the base 300. The sliding portion 400 is arranged to be slidable along the base 300 in the width direction of the top wall, so that the side wall 120 is arranged to be movable relative to the base 300 through the sliding portion 400 in the width direction of the top wall.

In these alternative embodiments, the sliding portion 400 can not only provide support to the side wall 120, but also provide good support to the curved portion 12 at the junction of the side wall 120 and the loading portion 112, and ensure complete laminating of the curved portion 12 of the curved cover plate 10 and the flexible screen 20. In addition, the side wall 120 can also move relative to the base 300 through the sliding portion 400.

The base 300 is provided with two limiting portions 320 respectively at two ends in the width direction of the top wall. The sliding portion 400 is located between the two limiting portions 320, and in the first state, there is a predetermined distance between the sliding portion 400 and the limiting portion 320.

In these alternative embodiments, a limit portion 320 is provided on the base 300 to limit the sliding portion 400 so as to prevent the side wall 120 from moving too far and prevent causing irreversible deformation of the flexible supporting board 100. At the same time, the limiting portion 320 can provide a limiting force to the side wall 120, thereby increasing the support of the side wall 120 to the flexible screen 20, and ensuring that laminating bubbles generated between the flexible screen 20 and the curved cover plate 10 can be avoided.

The sliding portion 400 can be disposed in many ways. In some optional embodiments, as shown in FIG. 7, the sliding portion 400 includes a pulley 410. One of the side walls 120 is arranged to be movable relative to the base 300 through the pulley 410. For example, an end of the side wall 120 away from the loading portion 112 is provided with a receiving portion 130. The pulley 410 is arranged in the receiving portion 130, and the pulley 410 is arranged to be movable relative to the base 300.

Or, in other alternative embodiments, please continue to refer to FIG. 6, the sliding portion 400 includes a sliding block 420 and at least two pulleys 410. The pulleys 410 are arranged on the side of the sliding block 420 facing the base 300, and at least two pulleys 410 are distributed in the width direction of the top wall and there is a space between two adjacent pulleys. The one of the side walls 120 is hinged with the sliding block 420.

In these alternative embodiments, the sliding portion 400 includes a sliding block 420, and the sliding block 420 can provide good support to the side wall 120. The sliding block 420 is provided with at least two pulleys 410 on the side of the sliding block 420 facing the base 300. The at least two pulleys 410 are distributed in the width direction of the top wall and there is a space between two adjacent pulleys. The sliding block 420 can move relative to the base 300 through the pulleys 410 in the width direction of the top wall. During the process of the flexible supporting board 100 being deformed from the first state to the second state, the two side walls 120 move in directions away from each other, and the distance between the side walls 120 and the base 300 gradually decreases, and the one of the side walls 120 is hinged with the sliding block 420, so that the angle between the side wall 120 and the sliding block 420 can be changed, and the normal and stable laminating is ensured.

Figure 8:
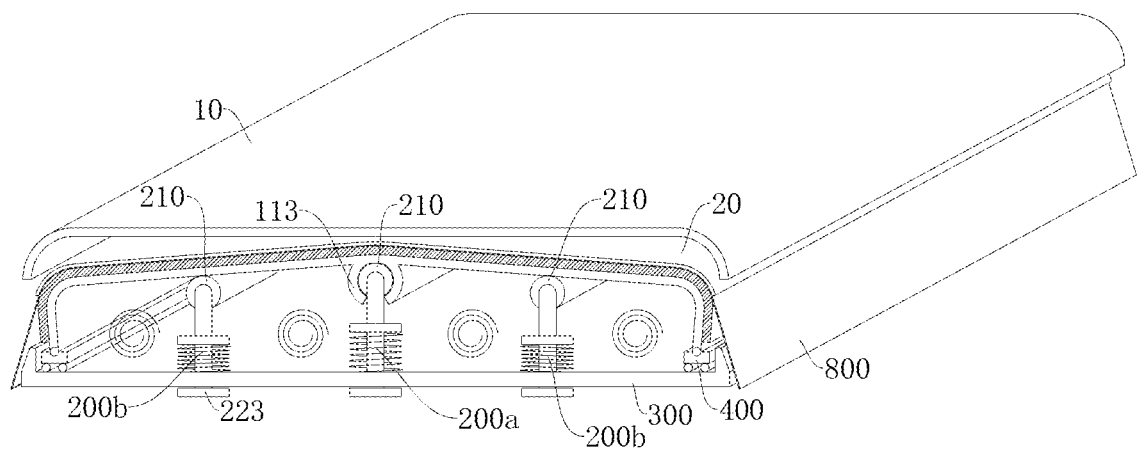
FIG. 8 is a schematic diagram of a structure of a laminating device provided by still another embodiment of the present application.
Figure 9:
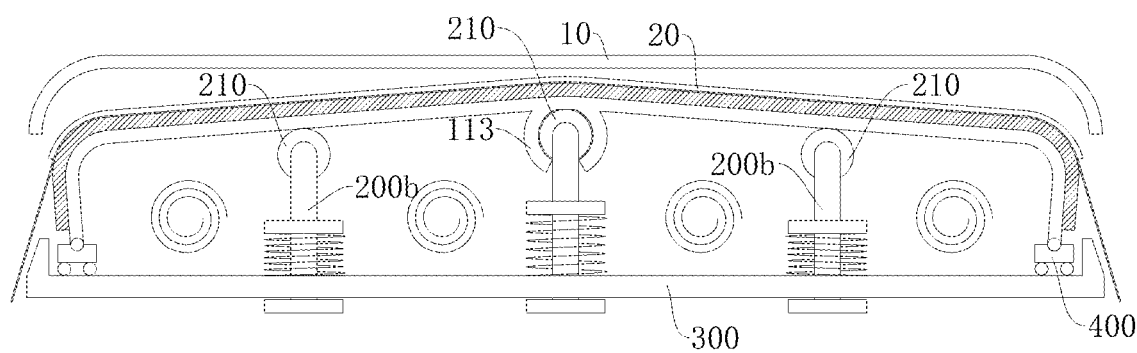
FIG. 9 is a schematic diagram of a structure of a laminating device from another perspective according to still another embodiment of the present application.
Figure 10:
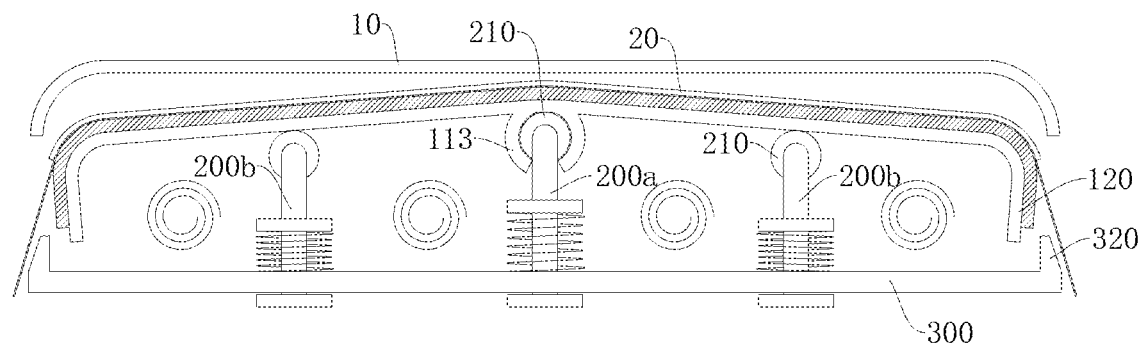
FIG. 10 is a schematic diagram of a structure of a laminating device provided by yet another embodiment of the present application.
Figure 11:
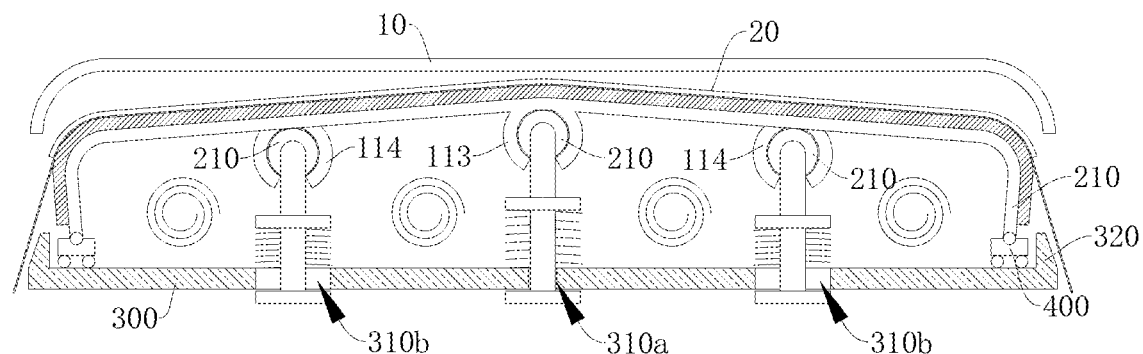
FIG. 11 is a schematic diagram of a structure of a laminating device provided by yet another embodiment of the present application.

Please refer to FIGS. 8 to 11 together. FIG. 8 is a schematic diagram of the three-dimensional structure of the laminating device 1 in another embodiment of the present application; FIG. 9 is a front view of the laminating device 1 in another embodiment of the present application; FIG. 10 is a front view of the laminating device 1 in further another embodiment of the present application; FIG. 11 is a front view of the laminating device 1 in still another embodiment of the present application.

In other optional embodiments, the number of elastic support assemblies 200 is at least two, and the at least two elastic support assemblies 200 further include a plurality of second support assemblies 200b, and the plurality of second support assemblies 200b are located on two sides of the first support assembly 200a in the width direction of the top wall, and the second support assemblies 200b are used to support the loading portions 112.

In these alternative embodiments, the second support assembly 200b can provide support to the loading portion 112 so as to prevent the loading portion 112 from being irreversibly deformed during the pressing process of the curved cover plate 10.

When the loading portion 112 is supported by the second support assembly 200b, in the first state, the height of the second support assembly 200b relative to the base 300 is lower than the height of the first support assembly 200a relative to the base 300, so that the flexible supporting board 100 can be formed in a ridge shape, and the loading portion 112 is obliquely connected between the central spine portion 111 and the side wall 120. In the second state, the height of the second support assembly 200b relative to the base 300 is equal to the height of the first support assembly 200a relative to the base 300, so that the top wall 110 is flat, and the flexible screen 20 and the flat portion 11 of the curved cover plate 10 are mutually laminated.

The number of the second support assembly 200b is not limited. In some optional embodiments, in order to ensure the force balance of the flexible supporting board 100, the number of the second support assemblies 200b on two sides of the first support assembly 200a in the width direction are equal. That is, the two loading portions 112 are supported by the same number of second support assemblies 200b.

Further, in some optional embodiments, the spacing distances between two adjacent elastic support assemblies 200 in the width direction are equal, so that the forces on the top wall 110 are balanced.

In some optional embodiments, the loading portion 112 is arranged to be movable relative to the base 300 through the second support assembly 200b in the width direction of the top wall. In these alternative embodiments, during a process of the flexible supporting board 100 being deformed from the first state to the second state, the loading portion 112 is arranged to be movable relative to the base 300 through the second support assembly 200b in the width direction of the top wall, so that the inclination of the loading portion 112 can be gradually reduced, and the extension size of the loading portion 112 in the width direction of the top wall gradually increases.

The loading portion 112 and the second support assembly 200b are relatively movable in the width direction in many ways. In some alternative embodiments, as shown in FIGS. 9 and 10, the support portion 210 of the second support assembly 200b can be rotatably connected to the guide rod 221, so that the loading portions 112 are arranged to be movable relative to the second support assembly 200b through the support portions 210 in the width direction of the top wall. In the process of decreasing the inclination of the loading portion 112, the support portion 210 rolls, so that the loading portion 112 can move relative to the base 300 in the width direction of the top wall. For example, the support portion 210 of the second support assembly 200b is a roller, and the roller is rotatably connected to the guide rod 221 of the second support assembly 200b.

In other alternative embodiments, as shown in FIG. 11, FIG. 11 shows a cross-sectional view of the base 300. At least two through holes 310 are provided. The at least two through holes 310 include a first through hole 310a corresponding to the first support assembly 200a and a plurality of second through holes 310b respectively corresponding to the second support assemblies. One of the second through holes 310b is a cashew shaped hole extending in the width direction of the top wall, and one of the second support assemblies 200b is disposed to be movable in the cashew shaped hole in the width direction of the top wall. The loading portions 112 are arranged to be movable relative to the base 300 through the second support assemblies 200b in the width direction of the top wall.

When the second through hole 310b is a cashew shaped hole, in some optional embodiments, the second support assembly 200b and the loading portion 112 may be fixedly connected, and the loading portion 112 drives the second support assembly 200b to move in the width direction of the top wall.

The second support assembly 200b is fixedly connected to the loading portion 112 in many ways. For example, the support portion 210 of the second support assembly 200b and the loading portion 112 are connected to each other by welding.

Or, in other optional embodiments, the fixed connection manner of the second support assembly 200b and the loading portion 112 is the same as the fixed connection manner of the first support assembly 200a and the central spine portion 111.

In some optional embodiments, the surface of the loading portion 112 facing the second support assembly 200b is provided with a second clamping portion 114, and the support portion 210 of the second support assembly 200b and the second clamping portion 114 are fixedly connected in a clamping manner. The second support assembly 200b is fixedly connected to the loading portion 112 in a clamping manner, that is, the second support assembly 200b is detachably connected to the loading portion 112 through the support portion 210 and the second clamping portion 114, which facilitates the disassembly and mounting of the laminating device 1, and then is convenient for the transportation of the laminating device 1.

In some optional embodiments, the second clamping portion 114, the support portion 210 of the second support assembly 200b, and the loading portion 112 have the same size in the length direction. This enables the second support assembly 200b to provide good support to the loading portion 112.

In some optional embodiments, one of the support portion 210 of the second support assembly 200b and the second clamping portion 114 is a clamping groove, and the other is a clamping post, and the clamping post is clamped in the clamping groove. Further, the size of the opening of the clamping groove is smaller than the size of the clamping post, so that the clamping groove can provide a limit to the clamping post, preventing the clamping post from being detached from the clamping groove via the opening.

When at least two elastic support assemblies 200 are provided, as shown in FIG. 10, the side wall 120 can be suspended so that the side wall 120 can be arranged to be movable relative to the base 300 in the width direction of the top wall. When the flexible supporting board 100 is deformed from the first state to the second state, since the side wall 120 is suspended, the side wall 120 can move freely in the width direction of the top wall.

When at least two elastic support assemblies 200 are provided, as shown in FIG. 11, a sliding portion 400 may also be provided on the side wall 120, and the side wall is arranged to be movable relative to the base 300 through the sliding portion 400 in the width direction of the top wall.

Figure 12:
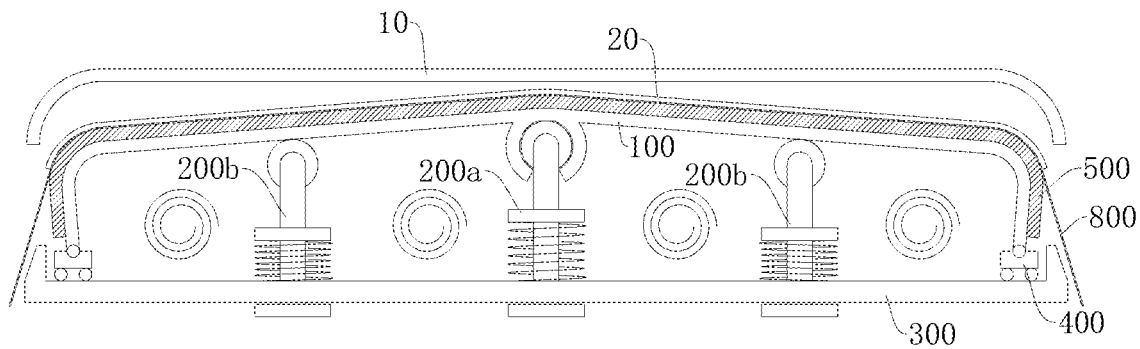
FIG. 12 is a schematic diagram of a structure of a laminating device in a first state according to an embodiment of the present application.
Figure 13:
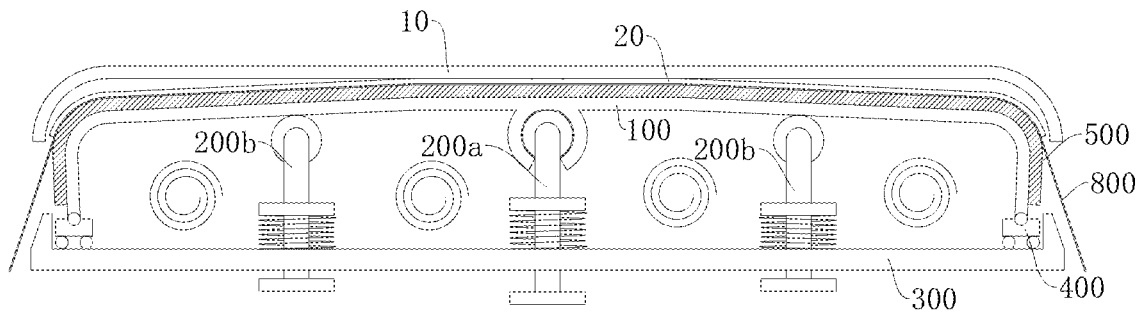
FIG. 13 is a schematic diagram of a structure of a laminating device in another state according to an embodiment of the present application.
Figure 14:
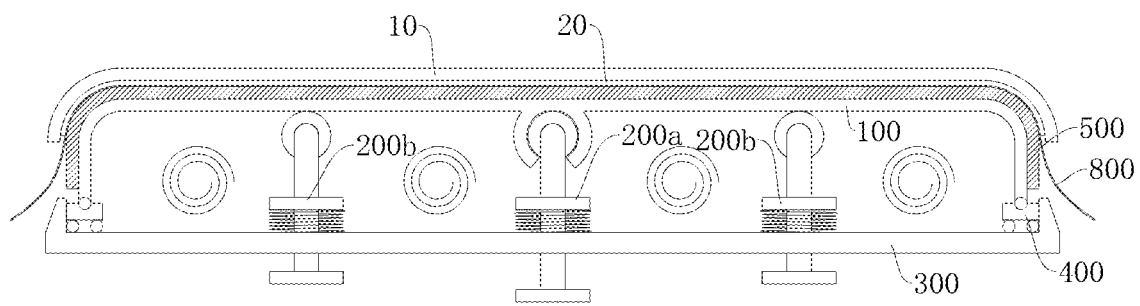
FIG. 14 is a schematic diagram of a structure of a laminating device in a second state according to an embodiment of the present application.

Please refer to FIGS. 12 to 14 together. FIGS. 12 to 14 show schematic diagrams of the use process of the laminating device 1 in an embodiment of the present application. FIG. 12 shows a schematic diagram of a structure of the flexible supporting board 100 of the laminating device 1 in the first state in an embodiment of the present application. FIG. 13 shows a schematic view of a structure of the flexible supporting board 100 of the laminating device 1 in the embodiment of the present application when it is deformed from the first state to the second state. FIG. 14 shows a schematic diagram of a structure of the flexible supporting board 100 of the laminating device 1 in the second state in the embodiment of the present application.

According to the laminating device 1 of the embodiment of the present application, in the initial stage of pressing, when the flexible supporting board 100 is in the first state, the curved cover plate 10 is firstly laminated at the position corresponding to the central spine portion 111. Pressure is applied to the curved cover plate 10. During the process of the flexible supporting board 100 being deformed from the first state to the second state, the contact of the curved cover plate 10 and the flexible screen 20 is realized by gradually pressing from the middle to the two sides. Finally, the curved cover plate 10 and the flexible screen 20 are completely laminated.

The embodiment of the present application can effectively reduce the bubbles between the curved cover plate 10 and the flexible screen 20 and improve the product yield. And in the first state, the size of the flexible supporting board 100 in the width direction of the top wall is small. When the bending angle of the curved portion 12 of the curved cover plate 10 is large, the flexible screen 20 on the flexible supporting board 100 can still be laminated with the curved cover plate 10 by gradually pressing from the middle to the two sides.

In some optional embodiments, the shape of the flexible supporting board 100 is adapted to the shape of the curved cover plate 10. When a hole is provided on the curved cover plate 10, a through hole 310 is provided at the corresponding position of the flexible supporting board 100 so as to prevent the protective pad 500 from rubbing against the hole wall of the hole under the squeeze of the flexible supporting board 100.

In some alternative embodiments, the side wall 120 includes an extension portion 121 and a transition portion 122. The side wall 120 and the loading portion 112 are smoothly connected by a transition portion 122, and the shape of the transition portion 122 is adapted to the shape of the curved portion 12 on the curved cover plate 10, so that the curved portion 12 can be completely laminated to the flexible screen 20. For example, when the curved portion 12 is provided on the outside of the transition portion 122 in a covering manner, the curved portion 12 and the transition portion 122 can be arranged equidistantly.

Figure 15:
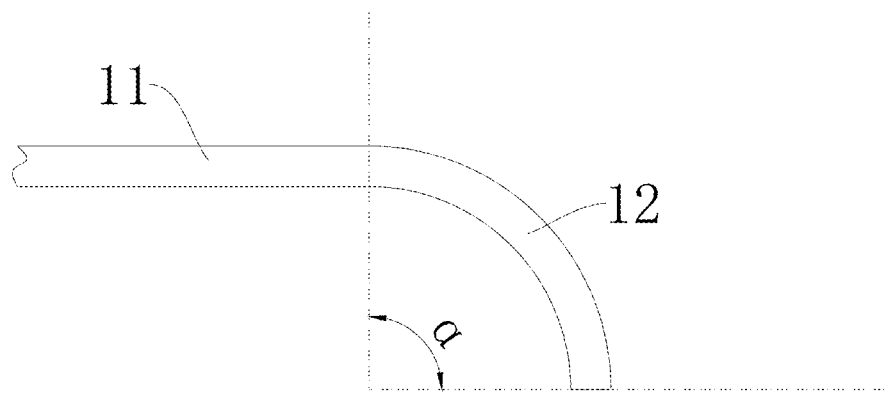
FIG. 15 is a schematic diagram of a partial structure of a curved cover plate.
Figure 16:
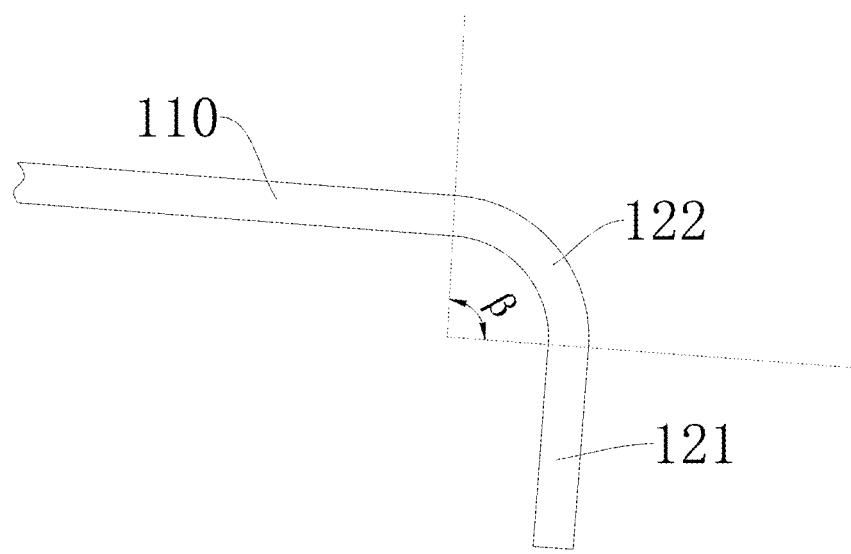
FIG. 16 is a schematic diagram of a partial structure of a flexible supporting board of a laminating device provided by an embodiment of the present application.

Please refer to FIGS. 15 and 16 together. FIG. 15 shows a schematic diagram of a partial structure of the curved cover plate 10, and FIG. 16 shows a schematic diagram of a partial structure of the top wall 110.

In some optional embodiments, when the curved portion 12 has a circular arc shape, the transition portion 122 has a circular arc shape, and the center of the circle where the circular arc of the curved portion 12 is located coincides with the center of the circle where the circular arc of the transition portion 122 is located. Further, the lines connecting the two ends of the curved portion 12 and the center of the circle where the circular arc of the curved portion 12 is located forms an α angle, and the lines connecting the two ends of the transition portion 122 and the center of the circle where the arc circle of the transition portion 122 is located forms a β angle, and the α angle and the β angle are equal.

When the surface of the flexible supporting board 100 is provided with a protective film, the radius R of the circular arc where the curved portion 12 is located and the radius r of the circular arc where the transition portion 122 is located satisfy the following formula:

$$R = r + d1 + d2 \tag{1}$$

Wherein d1 is the thickness of the flexible supporting board 100, and d2 is the thickness of the protective film.

When the surface of the flexible supporting board 100 is sequentially provided with a protective film and a guide film 800, the radius R of the circular arc where the curved portion 12 is located and the radius r of the circular arc where the transition portion 122 is located satisfy the following formula:

$$R = r + d1 + d2 + d3 \tag{2}$$

Wherein d3 is the thickness of the guide film 800.

When the radius R of the circular arc where the curved portion 12 is located and the radius r of the circular arc where the transition portion 122 is located satisfy the above relationship, it can be ensured that the spacing distance between the curved portion 12 and the transition portion 122 is consistent, so that the flexible screen 20 and the curved cover plate 10 can be laminated curvely.

The flexible supporting board 100 can be made of any suitable material, as long as the flexible supporting board 100 can be deformed and the flexible supporting board 100 can be deformed from the first state to the second state. In some optional embodiments, the material of the flexible supporting board 100 includes an elastic steel plate, and the elastic deformation of the elastic steel plate is used to enable the flexible supporting board 100 to be transformed between the first state and the second state. Further, in some optional embodiments, the material of the flexible supporting board 100 includes 60Si2MnA.

The thickness of the flexible supporting board 100 is disposed in many ways. In some optional embodiments, the thickness of the flexible supporting board 100 is 0.5 mm to 3 mm. When the thickness of the flexible supporting board 100 is between 0.5 mm and 3 mm, it can prevent the flexible supporting board 100 from being unable to carry the flexible screen 20 and the curved cover plate 10 due to the insufficient thickness of the flexible supporting board 100, and it can also prevent the flexible supporting board 100 from being difficult to deform caused by that the flexible carry board 100 is too thick. Further, the thickness of the flexible supporting board 100 is 1 mm-2 mm.

In some optional embodiments, the surface of the flexible supporting board 100 facing away from the elastic support assembly 200 is provided with a protective pad 500. The flexible screen 20 can be placed on the protective pad 500, and the protective pad 500 can provide the protection for the flexible screen 20, avoiding excessive hardness of the flexible supporting board 100 from damaging the flexible screen 20, and improving the product yield.

The material of the protective pad 500 can be disposed in many manner. For example, the material of the protective pad 500 includes silica gel, or the material of the protective pad 500 includes at least one of polyimide film, polyester film, magnesium fluoride film, zinc sulfide film and organic-inorganic laminated film. The use of these materials can ensure that the protective pad 500 has good flexibility.

Figure 17:
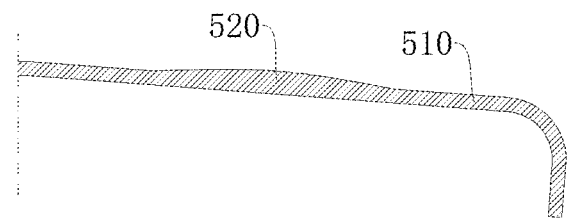
FIG. 17 is a schematic diagram of a partial structure of a protective pad of a laminating device provided by an embodiment of the present application.

Please also refer to FIG. 17 together. FIG. 17 shows a schematic diagram of a partial structure of the protective pad 500.

In some optional embodiments, the protective pad 500 includes a body portion 510 and a thickening portion 520 disposed on the body portion 510, and the thickening portion 520 has a thickness greater than that of the body portion 510. By providing the thickening portion 520, the supporting effect of the protective pad 500 for the flexible screen 20 can be improved, and the flexible screen 20 can be prevented from being squeezed and deformed.

The position of the thickening portion 520 can be disposed in many ways. In some optional embodiments, the thickening portion 520 is correspondingly located between the side wall 120 and the elastic support assembly 200. The portion of the loading portion 112 located between the side wall 120 and the elastic support assembly 200 is not supported, and there may be a problem of insufficient support. The thickening portion 520 is correspondingly disposed between the side wall 120 and the elastic support assembly 200 so as to improve the supporting force at this position, which prevents the flexible screen 20 from being squeezed and deformed.

In other optional embodiments, the number of elastic support assemblies 200 is at least two, at least two the elastic support assemblies 200 are distributed in the width direction of the top wall, there is a space between two adjacent elastic support assemblies, and the thickening portion 520 is correspondingly located between the adjacent elastic support assemblies 200. The portion of loading portion 112 located between the adjacent elastic support assemblies 200 may have a problem of insufficient support. Disposing the thickening portion 520 correspondingly between the adjacent elastic support assemblies 200 can increase the supporting force at this position and prevent the flexibility screen 20 from being squeezed and deformed.

The thickness of the protective pad 500 can be disposed in various ways. In some optional embodiments, the thickness of the protective pad 500 is 0.5 mm to 8 mm. The thickness of the protective pad 500 is within the range of 0.5 mm-8 mm, which can prevent from generating air bubbles between the curved cover plate 10 and the flexible screen 20 due to the protective pad 500 is too thick, and it can also prevent the protective pad 500 from providing adequate protection due to the protective pad 500 is too thin.

When the protective pad 500 includes the body portion 510 and the thickening portion 520, in some optional embodiments, the thickness of the body portion 510 is 0.5 mm to 3 mm, and the thickness of the thickening portion 520 is 2.5 mm to 6 mm.

Figure 18:
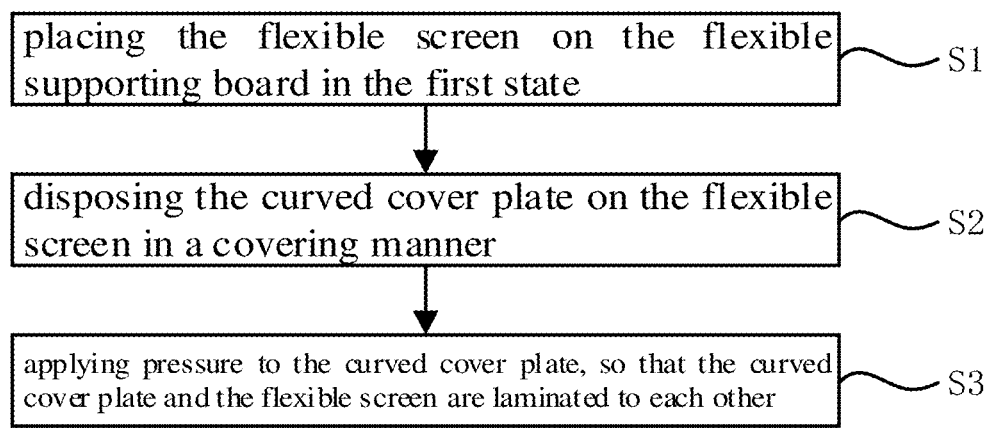
FIG. 18 is a flowchart of a laminating method provided by an embodiment of the present application.

Please refer to FIG. 18 together. The second embodiment of the present application also provides a laminating method for laminating the curved cover plate 10 and the flexible screen 20. The method is completed by using the laminating device 1 of any of the above embodiments. The methods include:

Step S1: Placing the flexible screen on the flexible supporting board, and making the flexible supporting board in the first state.

As described above, the flexible supporting board 100 in the first state is in the shape of a ridge, and the loading portion 112 is arranged obliquely. When the laminating device 1 includes the base 300, the distance between the central spine portion 111 and the base 300 is greater than the distance between the loading portion 112 (that is, the sidewall 120) and the base 300.

When the laminating device 1 includes the protective pad 500 and the guide film 800, the protective pad 500 is firstly disposed on the flexible supporting board 100, and then the guide film 800 is disposed on the protective pad 500, and then the flexible screen 20 is placed on the guide film 800. When the flexible screen 20 is placed on the guide film 800 and the curved cover plate 10 has not yet been pressed, the flexible supporting board 100 is in the first state.

When the flexible supporting board 100 is in the first state as shown in FIG. 3 in the natural state, the flexible screen 20 is directly disposed on the flexible supporting board 100 in the natural state (i.e. the first state) when use. When the flexible supporting board 100 is in the second state as shown in FIG. 4 in the natural state, before the flexible screen 20 is disposed on the flexible supporting board 100, or after the flexible screen 20 is disposed on the flexible supporting board 100, the flexible supporting board 100 is driven to be in the first state.

Step S2: disposing the curved cover plate on the flexible screen in a covering manner.

When the laminating device 1 includes a pressing station 600, the curved cover plate 10 can be disposed in the receiving groove of the pressing station 600, so that the pressing station 600 drives the curved cover plate 10 to move, and dispose the curved cover plate 10 on the flexible screen 20 in a covering manner. Since the flexible supporting board 100 in the first state is in the shape of a ridge, the curved cover board 10 is firstly laminated to the flexible screen 20 at the position corresponding to the central spine portion 111.

Step S3: Applying pressure to the curved cover plate, so that the curved cover plate and the flexible screen are laminated to each other.

Applying pressure to the curved cover plate 10, thereby causing that the flexible supporting board 100 is deformed from the first state to the second state. The inclination of the loading portion 112 is gradually reduced, and the two side walls 120 move away from each other. The curved cover plate 10 and the flexible screen 20 gradually laminate from the position corresponding to the central spine portion 111.

In these alternative embodiments, when the curved cover plate 10 is disposed on the pressing station 600, pressure is applied to the curved cover plate 10 through the pressing station 600, so that the flexible supporting board 100 is deformed from the first state to the second state. The curved cover plate 10 and the flexible screen 20 are gradually laminated. Since the contact between the flexible screen 20 and the curved cover plate 10 is gradually pressed from the middle to the two sides, air bubbles can be effectively eliminated and the yield of the product can be improved.

The skilled person in the art should understand that the above-mentioned embodiments are all exemplary rather than restrictive. Different technical features appearing in different embodiments can be combined to achieve beneficial effects.

What is claimed is:

1. A laminating device, adapted for laminating a curved cover plate and a flexible screen, the laminating device comprises:
a base;
a flexible supporting board configured to support the flexible screen, wherein the flexible supporting board comprises a top wall and two side walls facing to each other in a width direction of the top wall, the top wall has a central spine portion extending along a length direction of the top wall and loading portions located on both sides of the central spine portion, the top wall is connected to one of the side walls through one of the loading portions, and the side walls and the top wall enclose to form a hollow space;
at least one elastic support assembly located in the hollow space and configured to support the flexible supporting board, the at least one elastic support assembly comprising a first support assembly including a top end and a bottom end, wherein the bottom end is supported by and connected to the base and wherein the top end supports and is connected to the top wall of the flexible supporting board, wherein the elastic support assembly is arranged to be deformable in a pressing direction of the curved cover plate, and the flexible supporting board is deformed from a first state to a second state under a pressing effect of the curved cover plate;
wherein in the first state, the flexible supporting board is in a shape of a ridge, and one of the loading portions is obliquely connected between the central spine portion and one of the side walls, so that during a process of the flexible supporting board being deformed from the first state to the second state, an inclination of the loading portion gradually decreases.

2. The laminating device according to claim 1, wherein the at least one elastic support assembly comprises a support portion extending in the length direction of the top wall and at least two reset portions connected to the support portion, the support portion is configured to support the flexible supporting board, the at least two reset portions are distributed along the length direction, there is a space between two adjacent reset portions, and each of the reset portions is arranged to be deformable in the pressing direction of the curved cover plate.

3. The laminating device according to claim 2, wherein the base is provided with a plurality of through holes;
the reset portion comprises a guide rod and an elastic member, the guide rod is connected between the support portion and the base, one end of the guide rod is located in one of the through holes and is arranged to be movable in the pressing direction of the curved cover plate, the elastic member is arranged on the guide rod and is arranged to be deformable reciprocally along the guide rod.

4. The laminating device according to claim 3, wherein the guide rod has a first end and a second end opposite to each other in the pressing direction of the curved cover plate, the second end is connected to the support portion, a first baffle is connected to the first end, and the first baffle is located on a side of the base away from the top wall so as to prevent the guide rod from falling off from the one of the through holes.

5. The laminating device according to claim 3, wherein the elastic member is a spring, and the spring is sleeved on the guide rod.

6. The laminating device according to claim 3, wherein a second baffle is provided on the guide rod, the second baffle is located between the base and the top wall, and the elastic member is located between the base and the second baffle.

7. The laminating device according to claim 3, wherein the first support assembly is connected between the central spine portion and the base, and the first support assembly and the top wall are fixedly connected.

8. The laminating device according to claim 7, wherein a surface of the top wall facing the first support assembly is provided with a first clamping portion, and the support portion of the first support assembly and the first clamping portion are fixedly connected in a clamping manner.

9. The laminating device according to claim 7, wherein
the at least one elastic support assembly further comprises
a plurality of second support assemblies located on both sides of the first support assembly in the width direction of the top wall, the second support assemblies are configured to support the loading portions, and the loading portions are arranged to be movable in the width direction of the top wall relative to the base through the second support assemblies.

10. The laminating device according to claim 9, wherein the support portion of one of the second support assemblies is rotatably connected to the guide rod, so that the loading portions are arranged to be movable in the width direction of the top wall relative to the base through the support portions.

11. The laminating device according to claim 9, wherein the plurality of through holes comprise a first through hole corresponding to the first support assembly and a plurality of second through holes respectively corresponding to the second support assemblies, one of the second through holes is a cashew shaped hole extending along the width direction of the top wall, and one of the second support assemblies is arranged to be movable in the cashew shaped hole along the width direction of the top wall.

12. The laminating device according to claim 11, wherein a second clamping portion is provided on a surface of the loading portion facing one of the second support assemblies, and the support portion of the one of the second support assemblies is fixedly clamped within the second clamping portion.

13. The laminating device according to claim 3, wherein the side walls are arranged to be movable in the width direction of the top wall relative to the base.

14. The laminating device according to claim 13, wherein the side walls are arranged to be suspended relative to the base.

15. The laminating device according to claim 13, wherein the laminating device further comprises a sliding portion, the sliding portion is supported and connected between one of the side walls and the base, and the sliding portion is arranged to be slidable in the width direction of the top wall along the base.

16. The laminating device according to claim 15, wherein the sliding portion comprises a pulley, and one of the side walls is arranged to be movable relative to the base through the pulley.

17. The laminating device according to claim 15, wherein the sliding portion comprises a sliding block and at least two pulleys, the at least two pulleys are arranged on a side of the sliding block facing the base, and the at least two pulleys are distributed along the width direction of the top wall, there is a space between two adjacent pulleys, and the one of the side walls is hinged with the sliding block.

18. The laminating device according to claim 15, wherein the base is provided with two limiting portions at both ends in the width direction of the top wall, and the sliding portion is located between the two limiting portions, and in the first state, there is a predetermined distance between the sliding portion and the limiting portions.

19. The laminating device according to claim 1, further comprising a pressing station, wherein the pressing station comprises a receiving groove for accommodating the curved cover plate, the pressing station is located on a side of the flexible supporting board away from the elastic support assembly, and the pressing station is arranged to be movable along the pressing direction of the curved cover plate.

20. The laminating device according to claim 19, wherein the laminating device further comprises a plurality of heating components arranged in the hollow space, the laminating device comprises at least two elastic support assemblies, the at least two elastic support assemblies are distributed along the width direction, there is a space between two adjacent elastic support assemblies, and at least one of the heating components is located between the two adjacent elastic support assemblies and/or between one of the elastic support assemblies and one of the side walls.

* * * * *